United States Patent
Wang

(10) Patent No.: US 6,726,177 B2
(45) Date of Patent: Apr. 27, 2004

(54) VALVE WITH IMPROVED JUNK RING STRUCTURE

(75) Inventor: Chia-Lin Wang, Taipei Hsien (TW)

(73) Assignee: Value Valves Co., Ltd., Taipei Hsien (TW)

(*) Notice: Subject to any disclaimer, the term of this patent is extended or adjusted under 35 U.S.C. 154(b) by 38 days.

(21) Appl. No.: 10/187,358

(22) Filed: Jul. 2, 2002

(65) Prior Publication Data

US 2004/0004204 A1 Jan. 8, 2004

(51) Int. Cl.[7] .................................................. F16K 1/22
(52) U.S. Cl. ......................................... 251/306; 251/361
(58) Field of Search ................................ 251/307, 306, 251/305, 361

(56) References Cited

U.S. PATENT DOCUMENTS

| | | | | |
|---|---|---|---|---|
| 3,156,445 A | * | 11/1964 | Swain | 251/307 |
| 3,250,510 A | * | 5/1966 | Williams | 251/306 |
| 4,371,146 A | * | 2/1983 | Mese et al. | 251/209 |
| 4,770,393 A | * | 9/1988 | Hubertson | 251/306 |
| 5,620,167 A | * | 4/1997 | Habicht | 251/306 |

* cited by examiner

*Primary Examiner*—John Bastianelli
(74) *Attorney, Agent, or Firm*—Troxell Law Office PLLC

(57) ABSTRACT

The valve with an improved junk ring structure is composed of a main body, a valve disk, a washer and a junk ring. The main body has on one side thereof a stepped surface of which the outermost end has a screw thread portion on the inner wall thereof, the main body has on an inner wall thereof a protrusion. An upper and a lower pivotally connecting block are provided on the valve disk, and are movably connected by an axle provided on the main body. The junk ring has on the outer wall of the periphery thereof a screw thread portion mating with the screw thread portion of the main body. The washer is placed between the main body and the junk ring. By the arrangement of two screw threads (or multiple screw threads) with an identical screwing direction provided respectively on both the screw thread portions of the main body and of the junk ring, the entire valve can be assembled firmer and more convenient, the threads can be formed on a lathe simultaneously to reduce the number of times and the cost of production.

4 Claims, 6 Drawing Sheets

VALVE WITH IMPROVED JUNK RING STRUCTURE

BACKGROUND OF THE INVENTION

1. Field of the Invention

The present invention is related to a valve with an improved junk ring structure, and especially to an improved junk ring structure of which two screw threads (or multiple screw threads) with an identical screwing direction are provided respectively on both the screw thread portions of the main body and the junk ring, so that the valve can have the effect of being assembled firmly and conveniently, and the threads respectively of the main body and the junk ring can be formed on a lathe simultaneously to reduce the number of times and the cost of production. Thereby, the practicability as well as convenience of the valve can be largely increased, and the junk ring structure can suit the structures of valves or the like.

2. Description of the Prior Art

In industrial application, valves always have their important position, a conventional valve is comprised of a main body 10, a valve disk 11, a washer 12 and a junk ring 13 (referring to FIGS. 1, 2). Wherein, an axle 15 is provided on the main body 10 to movably connected with an upper and a lower pivotally connecting block 111 of the valve disk 11, and the main body 10 is provided on a recessed surface on one side thereof with four screw holes 101. The junk ring 13 is provided on a surface in correspondence with this side with four screw holes 131. And a plurality of screws 132 are used to firmly connect by screwing these members. The washer 12 is provided between the main body 10 and the junk ring 13 to control rotation of the valve disk 11 for opening or closing of the valve disk 11, to thereby make communication or blocking between two pipes 14 on the two sides of the main body 10.

However, such a structure has the following defects in manufacturing and using:

1. By virtue that the main body and the junk ring have screw holes mutually correspondingly arranged with intervals, when it is to lock by screws, angular adjustment is required; and the washer provided between the main body and the junk ring has elastic restoration capability, it will elastically stretch out when being compressed. Thereby, when the junk ring is locked in position, it will protrude outwardly rather than is flush with the periphery of the main body; when the pipes are forced to close to each other, the slightly protruding washers will be pressed to make damage of the screw threads.

2. By virtue that the main body and the junk ring have screw holes arranged with intervals on the round surfaces near the peripheries of themselves, the screw holes can not be made in one time, other machines with the required means for making these holes are needed to process separately, the manpower and the cost of production are accordingly increased.

SUMMARY OF THE INVENTION

The primary object of the present invention is to provide a valve with an improved junk ring structure, wherein, by connecting of the thread portions of the main body and the junk ring, the valve can have the effect of being assembled firmly and conveniently; thereby, the practicability of the valve can be largely increased.

The secondary object of the present invention is to provide a valve with an improved junk ring structure, wherein, the threads respectively of the main body and the junk ring can be formed on a lathe simultaneously to reduce the number of times and the cost of production.

To obtain the above stated objects, the present invention is composed of a main body, a valve disk, a washer and a junk ring, an internal axle of the main body is mounted thereon the valve disk, the main body is provided on the round surface near the periphery thereof with the washer which is fixed by pressing the assembled junk ring. The main body is provided on one side thereof with a stepped surface of which the outermost end has a screw thread portion on the inner wall thereof; the junk ring is provided on the outer wall of the periphery thereof with a screw thread portion mating with that of the main body. After the two screw thread portions are locked with each other, a front micro gap and a rear micro gap are left. The valve can have the effect of being assembled firmly and conveniently, and the threads respectively of the main body and the junk ring can be formed on a lathe simultaneously to reduce the number of times and the cost of production. Thereby, the practicability of the valve can be largely increased.

The present invention will be apparent in its structure as well as features after reading the detailed description of the preferred embodiment thereof in reference to the accompanying drawings.

DETAILED DESCRIPTION OF THE PREFERRED EMBODIMENT

Figure 1:
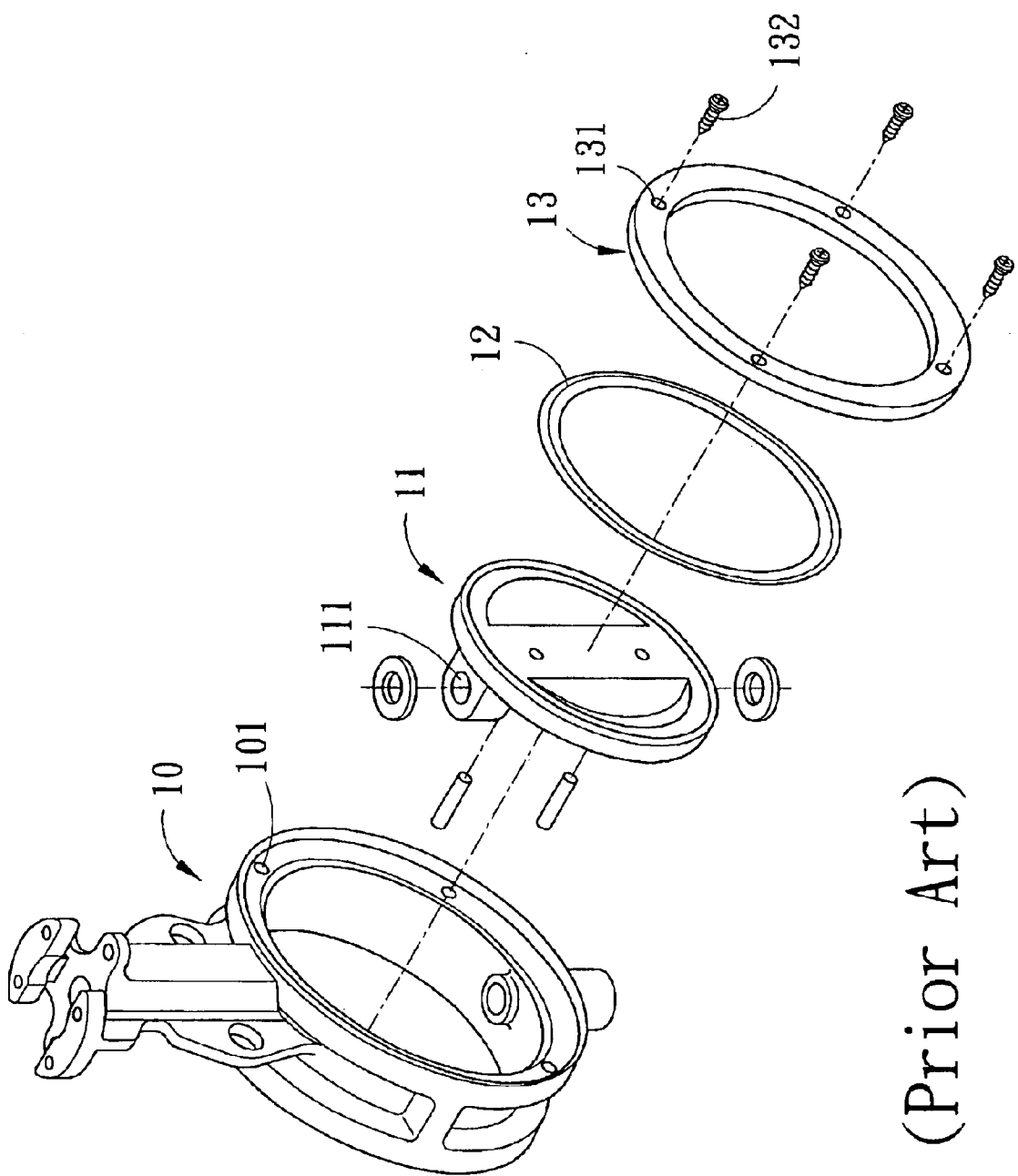
FIG. 1 is an analytic perspective schematic view showing the elements of a conventional valve.
Figure 2:
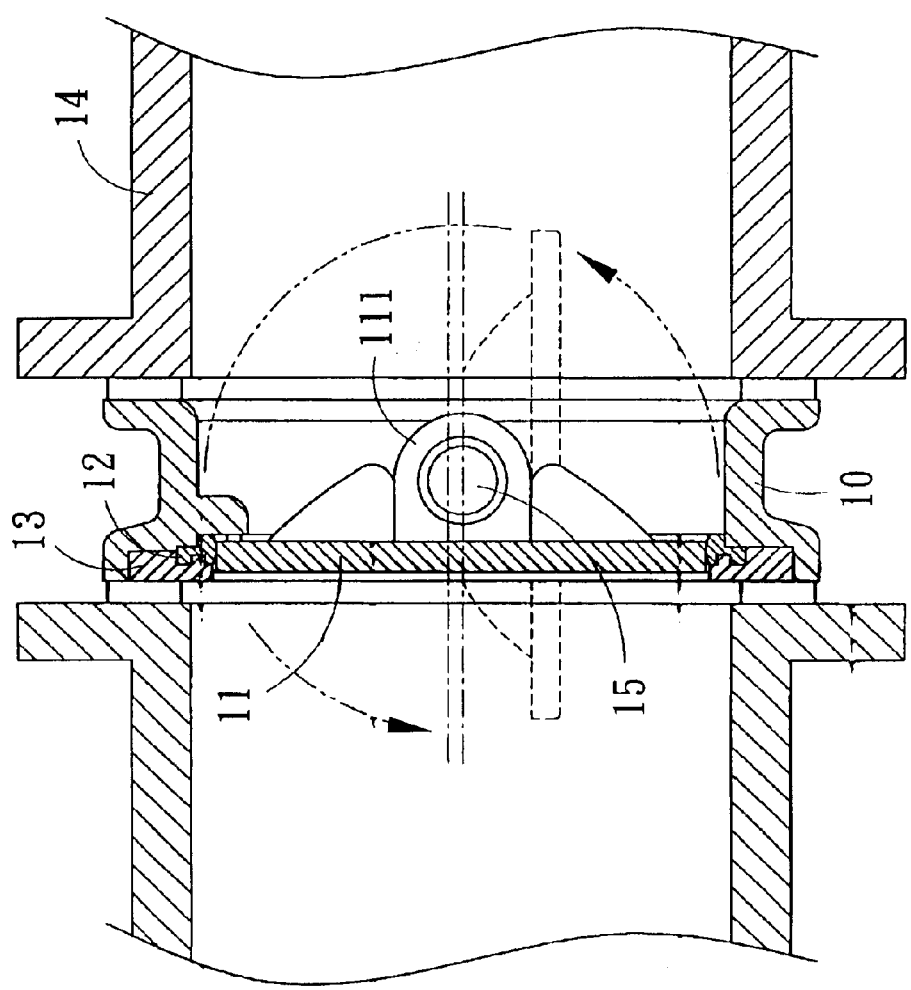
FIG. 2 is a sectional schematic view showing connection of the conventional valve.
Figure 3:
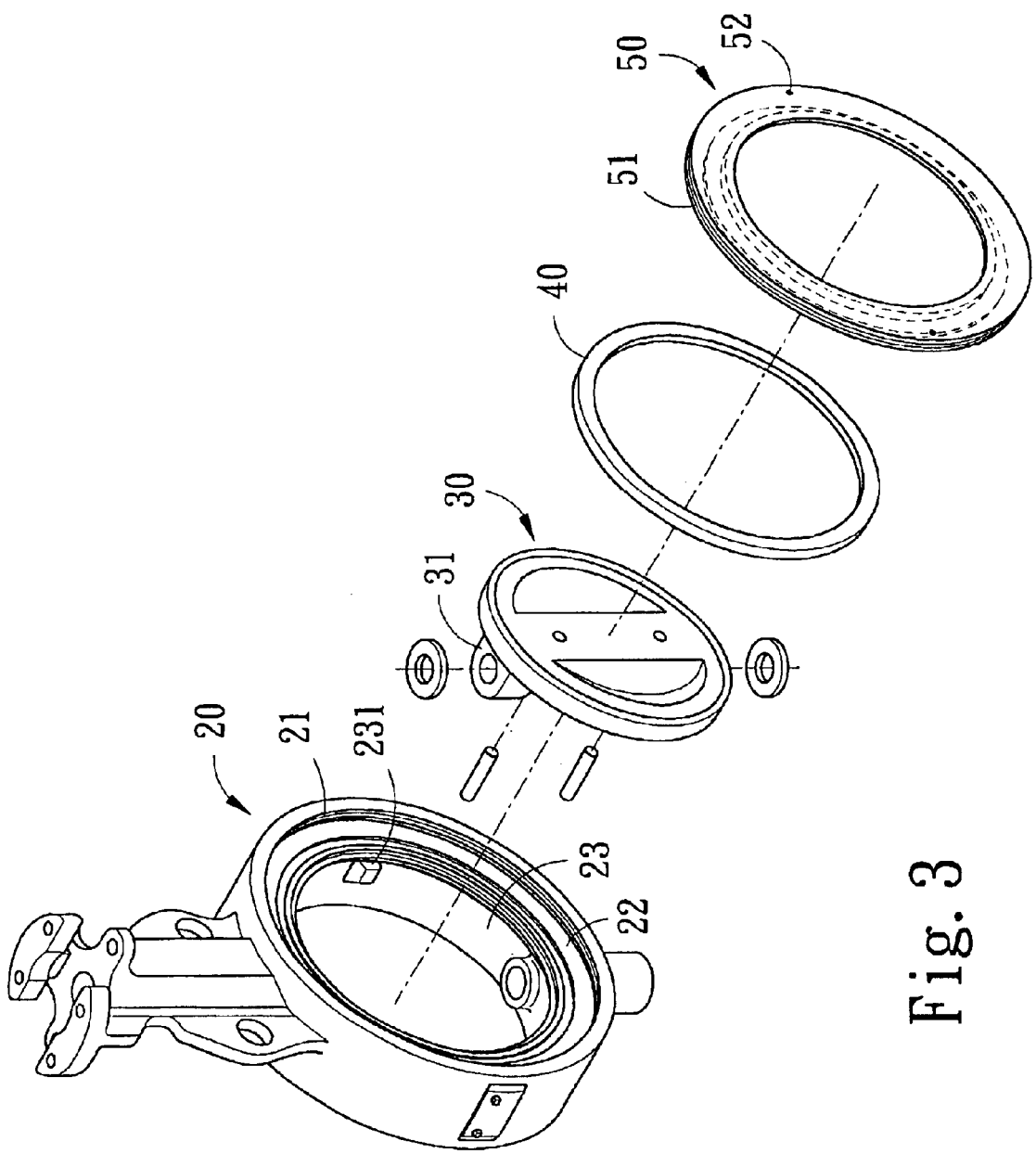
FIG. 3 is an analytic perspective schematic view showing the elements of the embodiment of the present invention.
Figure 4A:
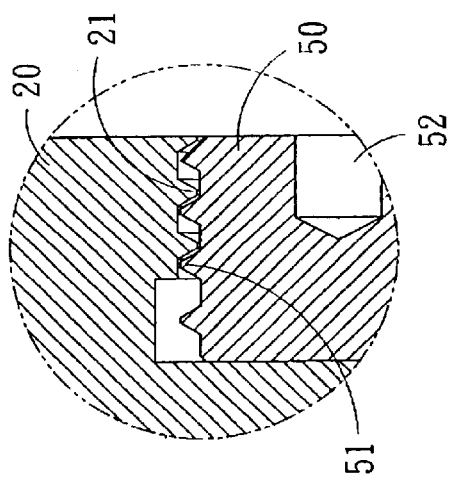
FIG. 4A is an enlarged cross-sectional view of the area A in FIG. 4.
Figure 4:
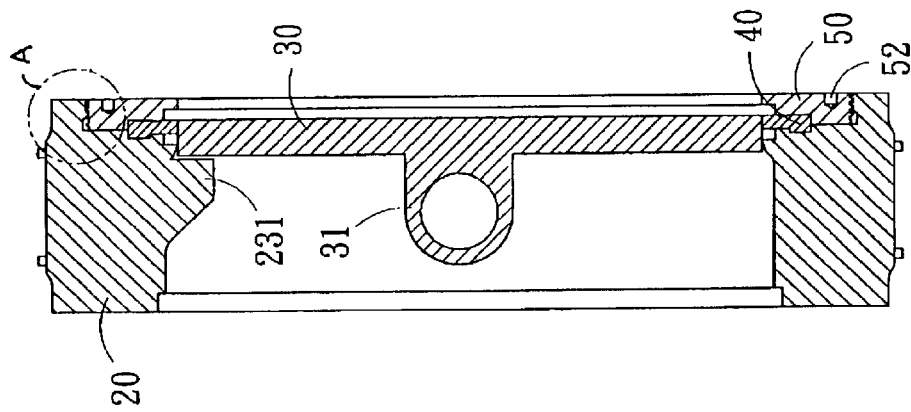
FIG. 4 a sectional schematic view showing connection of the embodiment of the present invention.
Figure 5:
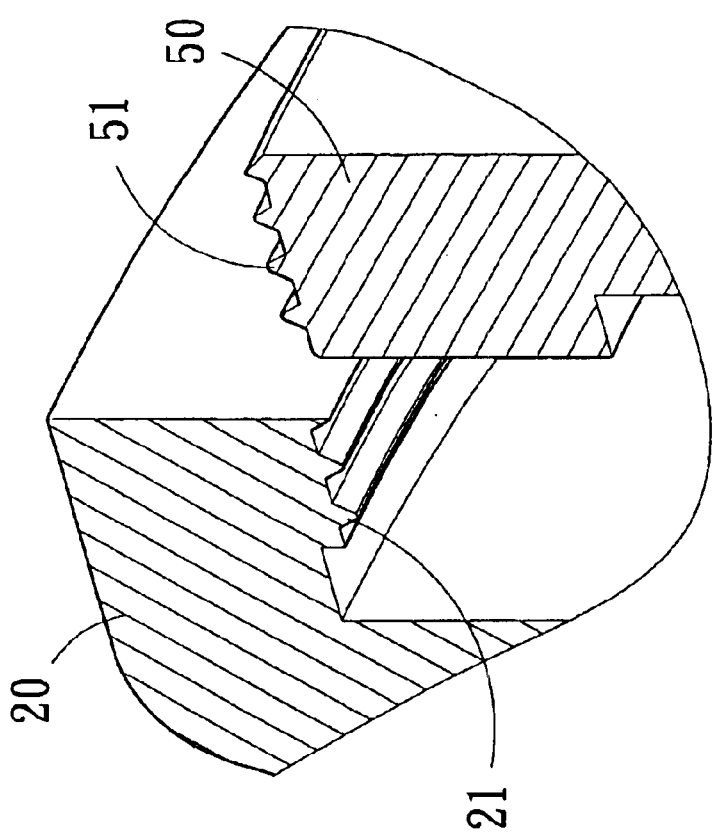
FIG. 5 is a perspective schematic sectional view showing the main body and the junk ring of the embodiment of the present invention.

Referring firstly to FIGS. 3–5, the valve with an improved junk ring structure of the present invention is composed of the elements including a main body 20, a valve disk 30, a washer 40 and a junk ring 50.

The main body 20 is provided on an inner wall 23 thereof with a stepped surface 22 of which the outermost end has a screw thread portion 21 on the inner wall thereof; the screw thread portion 21 has two screw threads with an identical screwing direction; the main body 20 is provided on one side thereof with a protrusion 231, and is provided on the round surface near the periphery thereof with the washer 40 which is fixed by pressing of the assembled junk ring 50.

The valve disk 30 is a closed round valve and is provided on the upper and the lower end of a diametrical central bar thereof each with a pivotally connecting block 31 to be movably connected by extending of an axle through the main body 20.

The junk ring 50 is provided on the outer wall of the periphery thereof with a screw thread portion 51 having two screw threads with an identical screwing direction and mating with the screw thread portion 21 of the main body 20.

By providing the improved junk ring structure for a valve composed of the abovementioned elements, referring to FIGS. 3–6, the present invention is characterized by that, an axle 70 is extended through the main body 20 and the upper and the lower pivotally connecting blocks 31 of the valve disk 30 for movable connection. And the junk ring 50 is provided on one side thereof with two dents 52 for inserting therein tools, then the junk ring 50 is rotated to make the screw thread portion 51 having two screw threads with an identical screwing direction screw in a matched way in the screw thread portion 21 of the main body 20.

With such a designing, the screw thread portion 21 of the main body 20 and the screw thread portion 51 of the junk ring 50 can be formed on a lathe simultaneously to reduce the number of times and the cost of production. The present invention thus can have the effect of being assembled firmly and conveniently, and the practicability and convenience of the present invention can be largely increased. And by the fact that connection of the screw thread portion 21 of the main body 20 with the screw thread portion 51 of the junk ring 50 is performed by providing a set of two-threads (or a set of multiple-threads) of which each set of threads have an identical screwing direction, this can largely improve the way of connecting between the main body and the junk ring both having a single thread with a single screwing direction as is the case before. In such a prior case, when the main body and the junk ring both having a single thread with a single screwing direction are connected with each other, the washer provided between the main body and the junk ring has elastic restoration capability, it will elastically stretch out when being compressed. Thereby, when the junk ring is locked in position, it will protrude outwardly rather than is flush with the periphery of the main body. Thereby, when two pipes are forced to close to each other, the slightly protruding washers will be pressed; and thereby, the designing of connecting between the main body and the junk ring will leave no gap between the main body and the junk ring, hence the screw threads will be damaged. In the present invention, when in connection of the screw thread portion 21 of the main body 20 with the screw thread portion 51 of the junk ring 50, micro gaps are left therebetween to be the spaces for expanding of the washer 40 when being forcedly compressed; thereby, the junk ring 50 is flush with the periphery of the main body 20; when the pipes are forced to close to each other, the gaps formed between the screw thread portions 21 and 51 can prevent the screw threads from being damaged.

Figure 6:
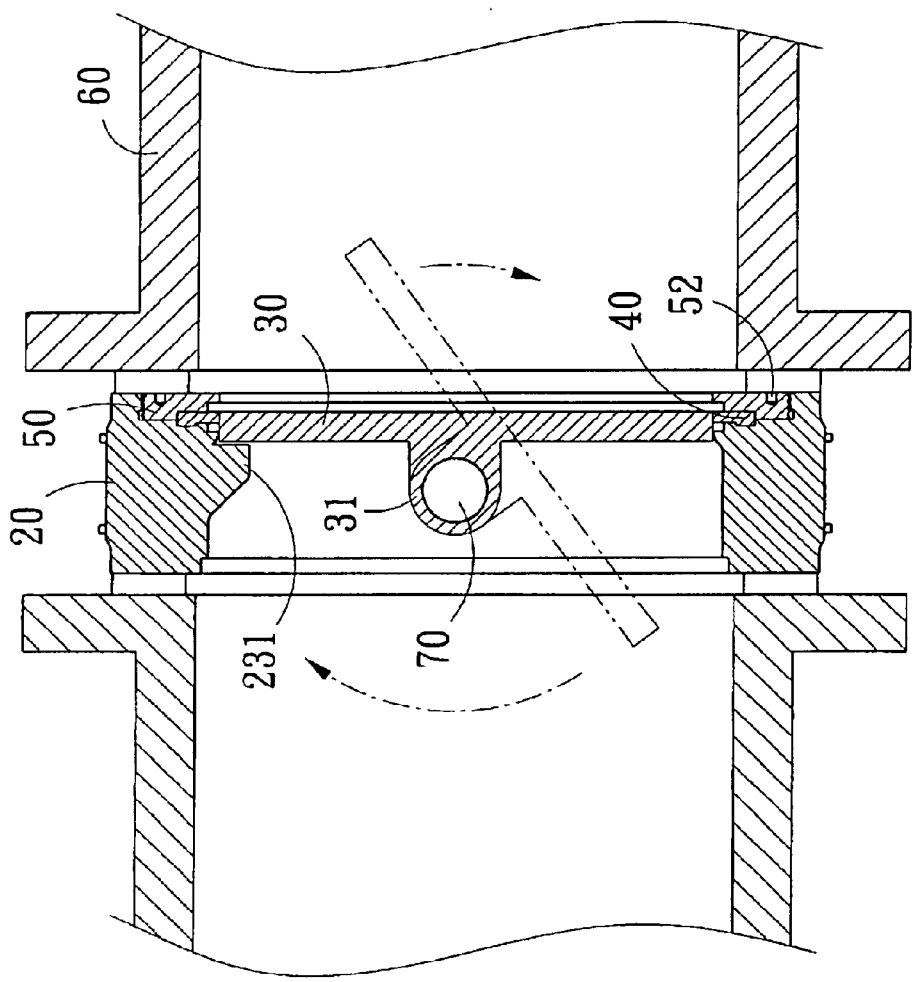
FIG. 6 a sectional schematic view showing connection of the embodiment of the present invention in use.

Referring to FIG. 6, in using, when the valve is assembled as stated above, the valve disk 30 is rotated about the axle 70 to open; now, two pipes 60 at the two sides of the main body 20 are communicated. When the valve is closed, one end of the valve disk 30 is abutted against the protrusion 231 on the inner wall 23 of the main body 20, the periphery of the valve disk 30 is tightly abutted on the washer 40 to form a sealed state. The entire structure of the valve can be assembled firmer, more durable and more convenient by the arrangement of two screw threads (or multiple screw threads) with an identical screwing direction provided respectively on both the screw thread portion 21 of the main body 20 and the screw thread portion 51 of the junk ring 50 to thereby reduce the number of times and the cost of production.

Accordingly, the present invention includes the following advantages:

1. By the arrangement of two screw threads (or multiple screw threads) with an identical screwing direction provided respectively on both the screw thread portion of the main body and the screw thread portion of the junk ring, gaps are formed to leave buffering spaces, thereby, damage of the screw threads can be avoided, this can increase the practicability of the entire valve.
2. By virtue that the screw threads of the main body and the junk ring can be made simultaneously, the number of times and the cost of production are accordingly reduced.

In conclusion, the present invention not only can get rid of the defects resided in the conventional valves, and by the arrangement of two screw threads (or multiple screw threads) with an identical screwing direction provided respectively on both the screw thread portion of the main body and the screw thread portion of the junk ring, the entire valve structure can be assembled firmer and more convenient, this can largely increase the practicability and convenience of the entire valve. And the junk ring structure can suit the structures of various valves.

Having thus described the technical process of my invention having high industrial value.

What I claim as new and desire to be secured by Letters Patent of the United States are:

1. A valve with an improved junk ring structure, wherein an internal axle of the main body of said valve is mounted thereon with a valve disk, said main body is provided on the round surface near the periphery thereof with a washer which is fixed by pressing said junk ring being assembled, said valve is characterized by:

said main body is provided on one side thereof with a stepped surface of which the outermost end has a screw thread portion on the inner wall thereof;

said junk ring is provided on the outer wall of the periphery thereof with a screw thread portion mating with said screw thread portion of said main body; after said two screw thread portions are locked with each other, a front micro gap and a rear micro gap are left therebetween to be the spaces for expanding of the washer when being forcibly compressed.

2. The valve with an improved junk ring structure as in claim 1, wherein said screw thread portions of said main body and said junk ring are respectively arranged to have two screw threads with an identical screwing direction for connecting of said main body with said junk ring.

3. The valve with an improved junk ring structure as in claim 1, wherein said screw thread portions of said main body and said junk ring are respectively arranged to have multiple screw threads with an identical screwing direction for connecting of said main body with said junk ring.

4. The valve with an improved junk ring structure as in claim 1, wherein said junk ring is provided on one side thereof with two dents for rotation of said junk ring.

* * * * *